United States Patent
Barnum

(10) Patent No.: US 12,515,892 B2
(45) Date of Patent: Jan. 6, 2026

(54) PNEUMATIC CONVEYANCE JET DIVERTER

(71) Applicant: Innovation Associates, Inc., Johnson City, NY (US)

(72) Inventor: Benjamin Barnum, Johnson City, NY (US)

(73) Assignee: Innovation Associates, Inc., Johnson City, NY (US)

(*) Notice: Subject to any disclaimer, the term of this patent is extended or adjusted under 35 U.S.C. 154(b) by 34 days.

(21) Appl. No.: 18/235,187

(22) Filed: Aug. 17, 2023

(65) Prior Publication Data

US 2024/0059499 A1 Feb. 22, 2024

Related U.S. Application Data

(60) Provisional application No. 63/371,719, filed on Aug. 17, 2022.

(51) Int. Cl.
*B65G 47/52* (2006.01)
*B65G 43/08* (2006.01)

(52) U.S. Cl.
CPC .......... *B65G 47/525* (2013.01); *B65G 43/08* (2013.01); *B65G 2201/0235* (2013.01); *B65G 2203/0233* (2013.01); *B65G 2203/042* (2013.01)

(58) Field of Classification Search
CPC ................. B65G 47/525; B65G 43/08; B65G 2201/0235; B65G 2203/0233; B65G 2203/042
See application file for complete search history.

(56) References Cited

U.S. PATENT DOCUMENTS

| | | | | | |
|---|---|---|---|---|---|
| 3,185,277 | A | * | 5/1965 | Agnew | B21D 43/18 193/31 R |
| 3,355,002 | A | * | 11/1967 | Greck | B23Q 7/16 198/367 |
| 3,685,632 | A | * | 8/1972 | Brady | B65G 47/525 198/618 |
| 3,874,740 | A | * | 4/1975 | Hurd | B65G 47/256 406/87 |
| 4,469,218 | A | * | 9/1984 | Cosse | B65G 47/71 198/438 |
| 5,388,682 | A | * | 2/1995 | Dudley | B65G 47/766 198/367 |
| 5,896,999 | A | * | 4/1999 | Bonnet | B65G 47/945 209/559 |
| 6,062,395 | A | * | 5/2000 | Oravetz | B67C 3/26 198/398 |
| 6,401,904 | B1 | * | 6/2002 | Risley | B65G 47/525 198/380 |
| 6,932,544 | B2 | * | 8/2005 | McMahon | A44B 19/267 406/176 |
| 10,745,211 | B2 | * | 8/2020 | Heuft | B65G 47/766 |
| 11,117,753 | B2 | * | 9/2021 | Sakota | B65G 47/71 |

\* cited by examiner

*Primary Examiner* — Mark A Deuble
(74) *Attorney, Agent, or Firm* — K&L Gates LLP

(57) ABSTRACT

Methods, systems, and apparatus are disclosed herein for a pneumatic conveyance jet diverter that uses air jets to divert pneumatically conveyed objects to one of various selectable outlets. The example methods, systems, and apparatus are configured direct objects from an inlet to a desired outlet without the use of mechanical components such as an internal flap or gate. Rather, the pneumatic conveyance jet diverter uses an air jet to push or blow objects to a selected outlet.

17 Claims, 14 Drawing Sheets

PNEUMATIC CONVEYANCE JET DIVERTER

PRIORITY CLAIM

This application claims priority to and the benefit of U.S. Provisional Patent Application Ser. No. 63/371,719, filed on Aug. 17, 2022, the entire disclosure of which is hereby incorporated by reference.

BACKGROUND

In fulfillment centers, conveyor belts route objects from one location to another location. Often objects are routed from a supply bin to a packaging area. In some instances, the objects are routed to stations that perform an action on the object. For example, to prepare medication containers for shipping to a patient, both the container and the cap are routed from separate supply bins. The container is routed to a filling station and then to a capping station that affixes the cap to the container. Some known fulfillment centers use pneumatic routing and diverters for this routing. Known pneumatic conveyance diverters may be used as part of pharmacy conveyance systems that perform online fulfillment of medication prescriptions. Pneumatic conveyance diverters in pharmacy conveyance systems serve to divert incoming objects, such as medications, medication container caps, or bottles, from a supply bin to various capping or filling stations. As such, pneumatic conveyance diverters play a role in directing objects from a source to a selected destination. In turn, pneumatic conveyance diverters may help at least to automate operations that may instead be performed at local pharmacies, such as prescription filling and packaging.

Known pneumatic conveyance diverters include a diverter tube that can be switched between two different outlets. The diverter tube is pivoted between the outlets based on how a cap or container are to be routed. A mechanical actuator is used to pivot the diverter tube.

However, there are various drawbacks to known pneumatic conveyance diverters. First, the mechanical components must pivot the diverter tube between two outlets. The movement of the diverter tube between the outlets takes time, which when compounded over a day, can cause bottlenecks in a conveyance system. Further, the mechanical nature of known diverters is prone to wear and alignment errors overtime, especially with high frequency use. A need accordingly exists for pneumatic conveyance diverters that provide routing of caps and/or containers without mechanically moving a diverter tube.

SUMMARY

Example systems, methods, and apparatus are disclosed herein for the routing of medication container caps or medication containers within a pharmacy conveyor system using a pneumatic conveyance jet diverter. The example systems, methods, and apparatus are configured to use air jets for directing pressurized air to inner walls of a diverter frame such that a medication container cap is routed from an inlet to a desired outlet. The disclosed systems, methods, and apparatus prevent pharmacy conveyance system disruptions as they include no mechanical parts that can jam or misalign. Further, the disclosed systems, methods, and apparatus prevent medication container cap damage as they do not include mechanical components that can crush or destroy lids or other objects. Finally, the use of air jets and lack of mechanical components allow for instantaneously directing medication container caps to a desired path within a medication fulfillment facility.

In light of the disclosure herein, and without limiting the scope of the invention in any way, in a first aspect of the present disclosure, which may be combined with any other aspect listed herein unless specified otherwise, a pneumatic conveyance jet diverter includes a diverter frame that has an inlet end having a first width, an outlet end having a second width that is wider than the first width, the outlet end including a first outlet and a second outlet, and side walls connecting the inlet end and the outlet end. The pneumatic conveyance jet diverter also includes an air jet positioned along one of the side walls and configured to at least partially face the outlet end, and at least one splitter located at the outlet end between the first outlet and the second outlet. The air jet is configured to emit pressurized air causing a medication container cap to be routed to the first outlet. An absence of the pressured air from the air jet causes the medication container cap to be routed to the second outlet.

In a second aspect of the present disclosure, which may be combined with any other aspect listed herein unless specified otherwise, the diverter frame has a narrow end at the inlet end that gradually widens to an opposite, wide end at the outlet end.

In a third aspect of the present disclosure, which may be combined with any other aspect listed herein unless specified otherwise, the inlet end of the diverter frame is pneumatically connected to a conveyance tube that provides the medication container cap.

In a fourth aspect of the present disclosure, which may be combined with any other aspect listed herein unless specified otherwise, the diverter frame is symmetrical along a longitudinal axis extending between a center of the inlet end to a center of the outlet end.

In a fifth aspect of the present disclosure, which may be combined with any other aspect listed herein unless specified otherwise, the second outlet is positioned to be closer to the air jet than the first outlet of the diverter frame.

In a sixth aspect of the present disclosure, which may be combined with any other aspect listed herein unless specified otherwise, the air jet is located near the inlet, and the air jet emits air at an angle such that a resulting air path flows to a side wall that is opposite the air jet and along the diverter frame, out to the first outlet.

In a seventh aspect of the present disclosure, which may be combined with any other aspect listed herein unless specified otherwise, the pneumatic conveyance jet diverter further includes a lid.

In an eighth aspect of the present disclosure, which may be combined with any other aspect listed herein unless specified otherwise, the lid is coupled to a side wall of the diverter frame via a hinge that is opposite from the side wall that includes the air jet.

In a ninth aspect of the present disclosure, which may be combined with any other aspect listed herein unless specified otherwise, the medication container cap is received through the inlet end of the diverter frame and travels along the path of the air jet through the outlet end.

In a tenth aspect of the present disclosure, which may be combined with any other aspect listed herein unless specified otherwise, the pneumatic conveyance jet diverter further includes a sensor located adjacent to the inlet end.

In an eleventh aspect of the present disclosure, which may be combined with any other aspect listed herein unless specified otherwise, the sensor is configured to sense the medication container cap being received through the inlet end, and after sensing the medication container cap, transmit a signal to a computer that determines whether the air jet should be activated to emit the pressurized air.

In a twelfth aspect of the present disclosure, which may be combined with any other aspect listed herein unless specified otherwise, the first outlet is pneumatically connected to a first outlet conveyance tube and the second outlet is pneumatically connected to a second outlet conveyance tube.

In a thirteenth aspect of the present disclosure, which may be combined with any other aspect listed herein unless specified otherwise, a pneumatic conveyance jet diverter system includes a diverter frame comprising an inlet end having a first width, an outlet end having a second width that is wider than the first width, and first and second side walls connecting the inlet end and the outlet end. The outlet end of the diverter frame includes a first outlet and a second outlet. The system also includes a first air jet positioned along the first side wall and configured to at least partially face the first outlet and a second air jet positioned along the second side wall and configured to at least partially face the second outlet. The system further includes at least one splitter located at the outlet end between the first outlet and the second outlet. The first air jet, when activated, is configured to emit pressurized air causing a medication container cap or a medication container to be routed to the first outlet. The second air jet, when activated, is configured to emit pressurized air causing the medication container cap or the medication container to be routed to the second outlet.

In a fourteenth aspect of the present disclosure, which may be combined with any other aspect listed herein unless specified otherwise, the first air jet is pneumatically coupled to a pressure source via a first valve, and the second air jet is pneumatically coupled to the pressure source via a second valve.

In a fifteenth aspect of the present disclosure, which may be combined with any other aspect listed herein unless specified otherwise, the first air jet is activated by opening the first valve and the second air jet is activated by opening the second valve.

In a sixteenth aspect of the present disclosure, which may be combined with any other aspect listed herein unless specified otherwise, a computer is configured to cause either of the first valve or the second valve to open for routing the medication container cap or the medication container to either the first outlet or the second outlet.

In a seventeenth aspect of the present disclosure, which may be combined with any other aspect listed herein unless specified otherwise, the system further includes a sensor located adjacent to the inlet end. The sensor is configured to detect the medication container cap or the medication container entering the diverter frame.

In an eighteenth aspect of the present disclosure, which may be combined with any other aspect listed herein unless specified otherwise, the computer is configured to determine whether the first valve or the second valve is to be opened after receiving an input from the sensor indicative of the detection of the medication container cap or the medication container.

In a nineteenth aspect of the present disclosure, which may be combined with any other aspect listed herein unless specified otherwise, the computer is configured to alternate between opening the first valve and the second valve.

In a twentieth aspect of the present disclosure, which may be combined with any other aspect listed herein unless specified otherwise, the inlet end of the diverter frame is pneumatically connected to a conveyance tube that provides the medication container cap or the medication container.

In a twenty-first aspect of the present disclosure, any of the structure, functionality, and alternatives disclosed in connection with any one or more of FIGS. 1 to 9 may be combined with any other structure, functionality, and alternatives disclosed in connection with any other one or more of FIGS. 1 to 9.

In light of the present disclosure and the above aspects, it is therefore an advantage of the present disclosure to provide a pneumatic conveyance jet diverter that has no internal mechanical components that are suitable to jamming or misalignment.

It is another advantage of the present disclosure to provide a pneumatic conveyance jet diverter that has no internal mechanical components that take time to actuate between different positions.

It is a further advantage of the present disclosure to provide a pneumatic conveyance jet diverter that can instantaneously pneumatically direct objects such as medication caps and containers to different outlets.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1A:
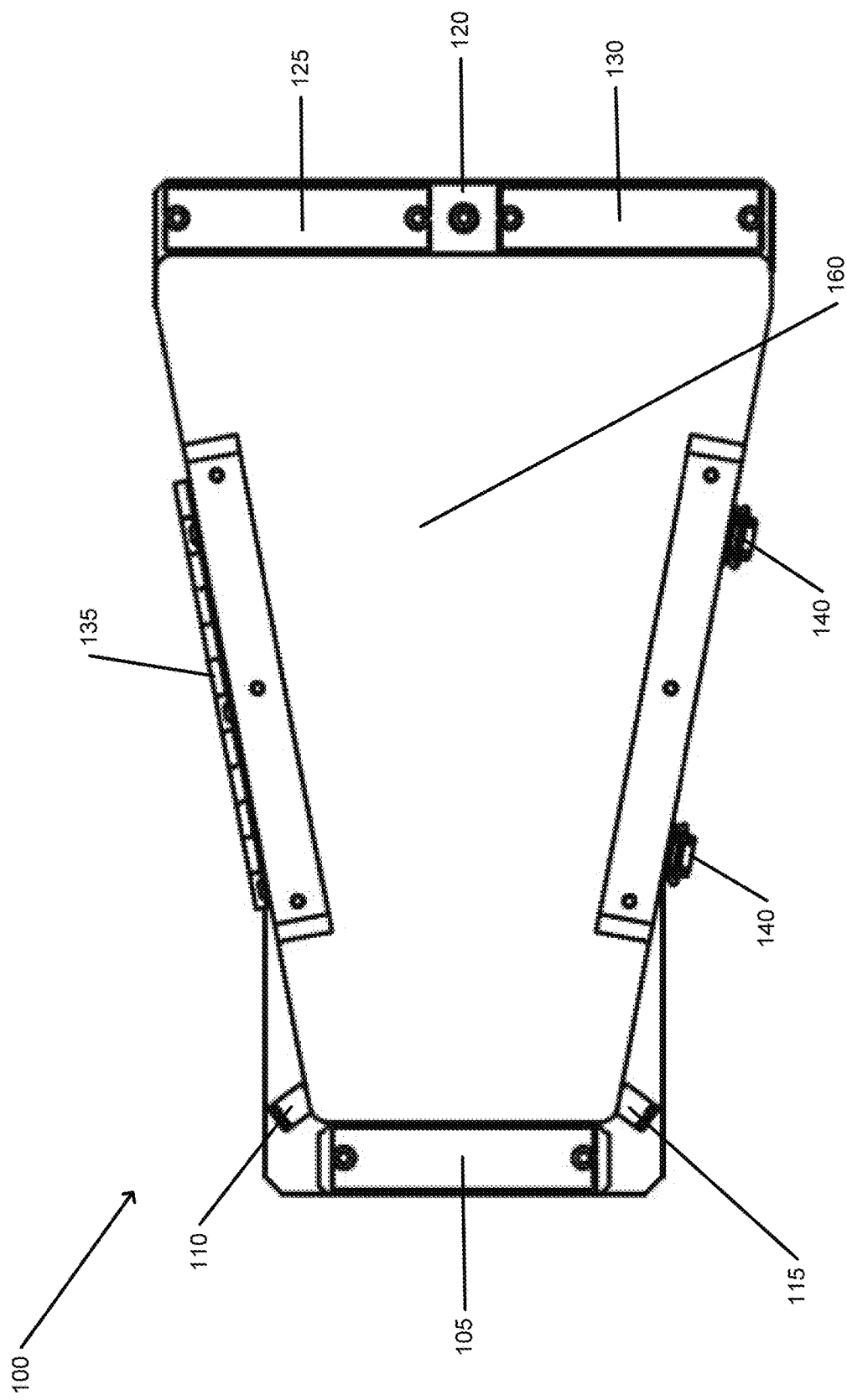
FIGS. 1A-C are top-down views of a pneumatic conveyance jet diverter, according to an example embodiment of the present disclosure.

Methods, systems, and apparatus are disclosed herein for a pneumatic conveyance jet diverter that uses air jets to divert pneumatically conveyed objects to one of various selectable outlet openings. The example methods, systems, and apparatus are configured direct objects from an inlet to a desired outlet without the use of mechanical components such as an internal flap or gate. Rather, the pneumatic conveyance jet diverter uses an air jet to push or blow objects to a selected outlet. The use of air jets, rather than internal flaps or gates, means that there are no internal, mechanical components that jam, or that crush or destroy the objects. Relatedly, because air jets can be activated instantaneously, unlike internal flaps or gates, the use of air jets allows for uninterrupted diverter use with instant desired outlet opening changes. In some embodiments, multiple pneumatic conveyance jet diverters are stacked on top of each other, such that the use of multiple diverters results in a cascading effect when the diverters are used simultaneously.

Reference is made herein to air jets. As disclosed herein, an air jet refers to a port that provides a continuous air flow that is selectively activated by way of a computer-controlled valve, pressure regulator, and/or pressurized air or pneumatic source. The air jet includes an orifice diameter of 0.093" for providing pressurized air in a range of 70 to 90 psi, for example, with a lower limit pressure of about 40 psi. In alternate embodiments, the orifice diameter may be smaller or larger, which in turn changes the working pressure range for the air jet. In some embodiments, the air jet continuously emits pressurized air while the diverter is in operation. However, alternate embodiments include a sensor (e.g., sensor 139 of FIG. 3) near the inlet opening, such that an air jet is activated only when the sensor is activated by the presence of a medication container cap, or other object. Alternatively, an air jet may be temporarily deactivated when a medication container and/or cap is detected based on a specified routing path.

Reference is made herein to medication container caps, containers, and bottles. As disclosed herein, a medication container cap refers to a medication bottle lid. A medication container cap may have dimensions of 2.33" in diameter by 0.185" in height, for example, and a mass of approximately 6 grams. In some embodiments, the diverter can be used to direct smaller and lighter medication container caps, and dimensions can be scaled up to divert larger medication container caps.

As disclosed herein, a bottle refers to a medication receptacle, vial carrier, or other container for housing or moving medication pills. A bottle may include a cylindrical container or a package for housing pills or pill packs. A bottle usually includes a lid that is secured during a filling or packing process. A bottle also usually includes a label with prescription and/or medication information. The label may include a unique identifier for tracking the bottle. In some embodiments, the diverter inlet and outlet opening, as well as inner chamber, could be made cylindrical to direct vials or bottles.

While the example methods, apparatus, and systems are disclosed herein as operating with medication container caps and bottles, it should be appreciated that the methods, apparatus, and systems may be operable with other articles. For example, the methods, apparatus, and systems may provide for the routing of packages in a facility, products to be packaged in a facility, and/or components to be assembled into a product along an assembly line. The methods, apparatus, and systems may, for example, provide for the routing of packaged clothing or other articles.

Reference is also made herein to prescriptions and medications. A prescription is generated by a pharmacy based on a document (commonly referred to a medication order), which is provided by a clinician. A medication order designates a particular patient for receiving a specified dosage of a medication. References to a prescription herein refer to information from a medication order in addition to prescription fill information for a particular patient/medication. In other words, a prescription is a single medication fill event for a particular patient that is performed by a pharmacy, such as a pharmacy fulfillment center. A medication includes a pill, tablet, or other solid pharmaceutical drug dosage that is consumed by a patient. A medication may also include a compounded pharmaceutical that is prepared from two or more substances.

Pneumatic Conveyance Jet Diverter

Figure 1B:
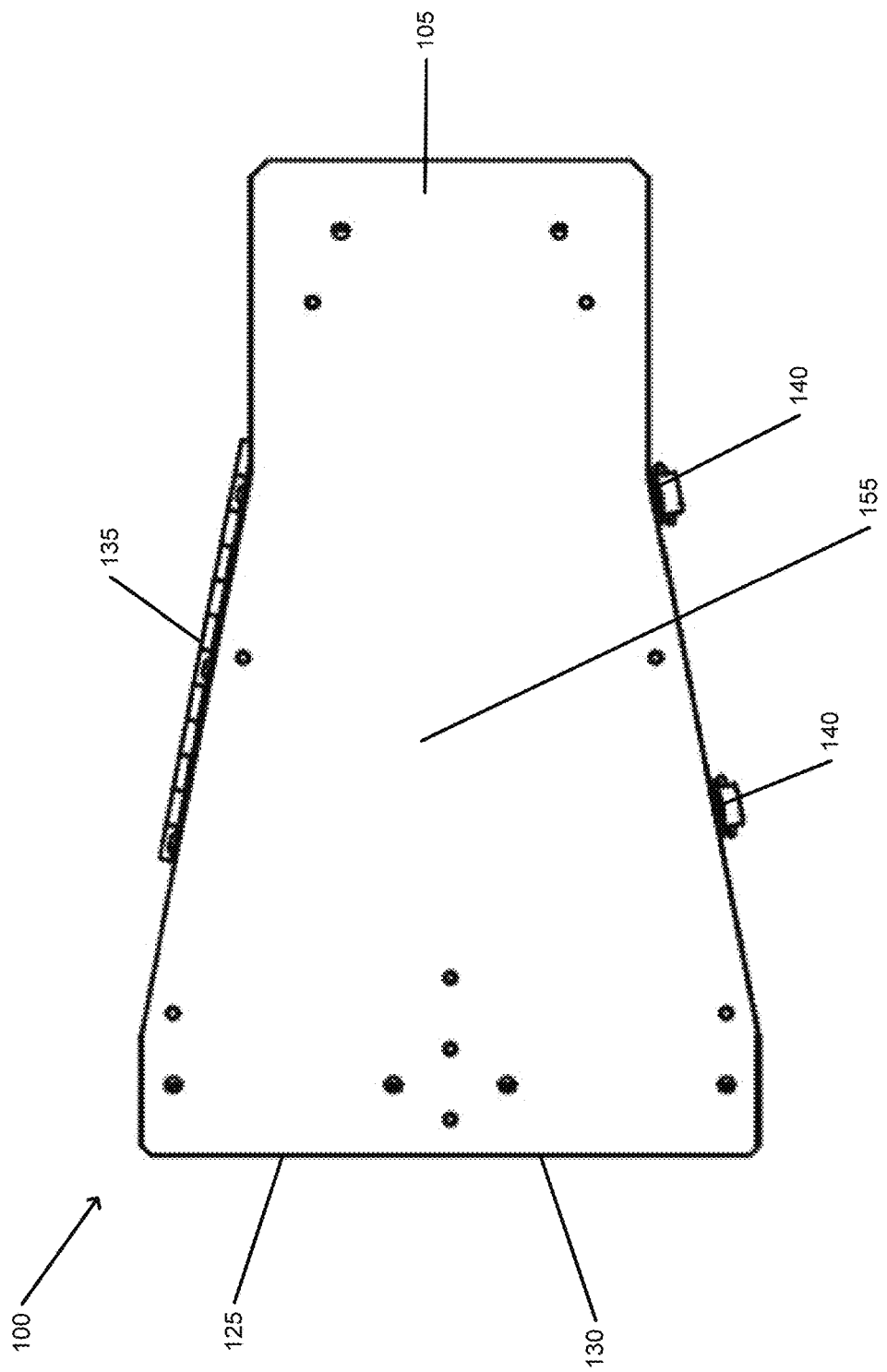
Figure 1C:
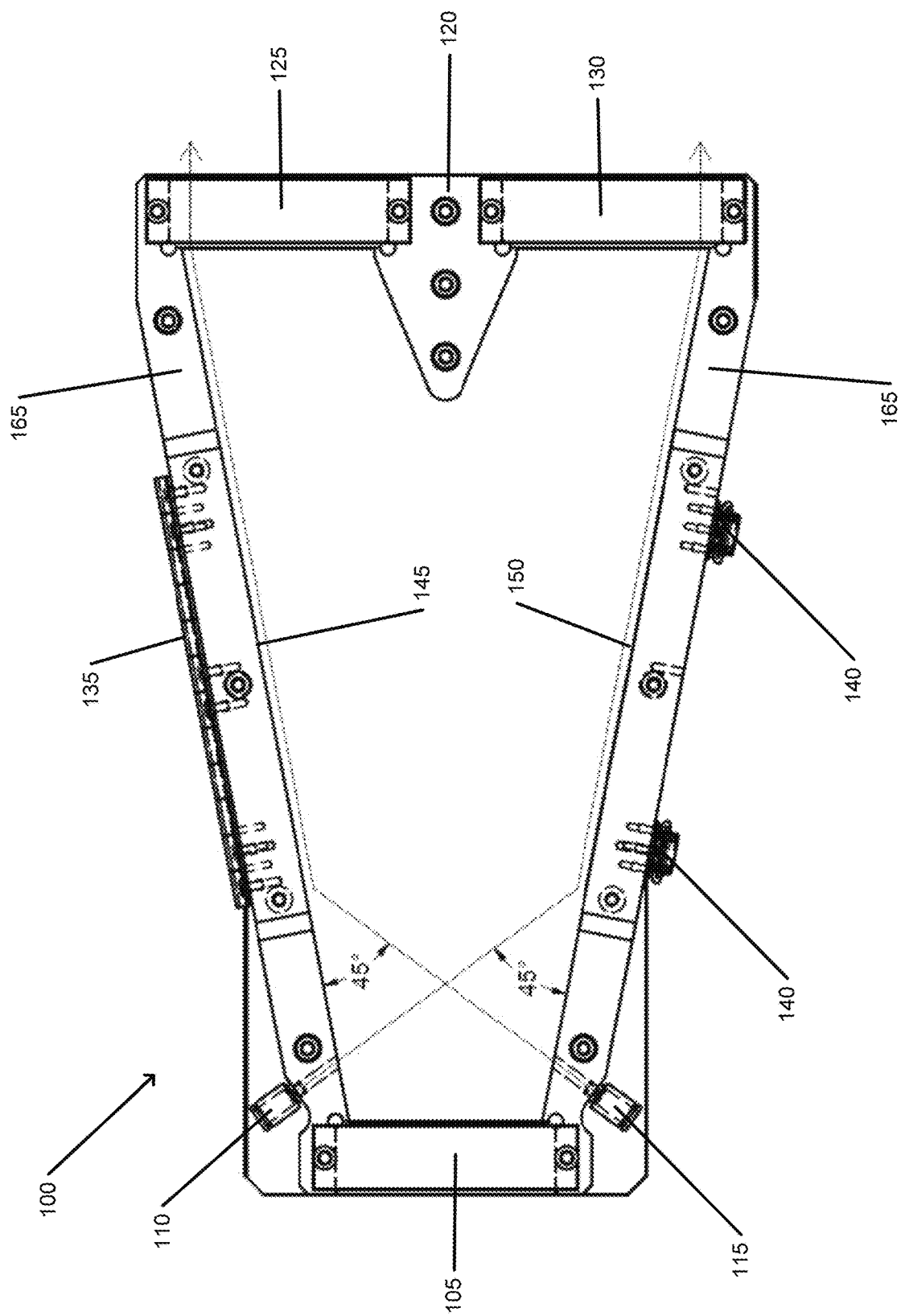

With reference to the Figures, FIGS. 1A-C illustrate top-down views of a pneumatic conveyance jet diverter 100. FIG. 1A shows the top of a pneumatic conveyance jet diverter 100. The diverter 100 includes a first side 155, a second side 160, side walls 165 (see FIGS. 1C & 2A), a splitter 120, an inlet 105, first and second outlets 125, 130, and air jets 110, 115.

The second side 160 is a flat sheet-like component made of metal or another durable material. The second side 160 has a narrow end across from a wide end. Two identical sides flank the narrow and wide ends, such that the second side 160 is symmetrical along a narrow-to-wide longitudinal axis. As such, the second side 160 has a narrow-to-wide rectangle-like shape. The narrow end of the second side 160 helps define the narrow, inlet 105 of the diverter 100 and the wide end of the second side 160 helps define the wide, outlets 125, 130 of the diverter 100. The sides of the second side 160 align with the side walls 165 (described below, seen in FIGS. 1C & 2A) such that the second side 160 can lay flat and be supported by the side walls 165. One of the sides of the second side 160 is coupled with a hinge 135. The other side of the second side 160 is coupled with a first part of a lock 140.

The first side 155 resembles the second side 160, as seen in FIG. 1B. The first side 155 is a flat sheet-like component made of metal or another durable material. The first side 155 has a narrow end across from a wide end. Two identical sides flank the narrow and wide ends, such that the first side 155 is symmetrical along the narrow-to-wide longitudinal axis. As such, the first side 155 has a narrow-to-wide rectangle-like shape. It should be noted that the narrow end of the first side 155 is somewhat wider than the narrow side of the second side 160, such that the first side 155 has a resulting extra overhang on the narrow side. The narrow end of the first side 155 helps define the narrow, inlet 105 side of the diverter 100 and the wide end of the first side 155 helps define the wide, outlets 125, 130 side of the diverter 100. Side walls 165 (further described below) couple with the first side 155 along the first side's 155 edges. The side walls 165 are positioned to mirror the dimensions of the second side 160. As such, once the side walls 165 are coupled to the first side 155, the first side 155 has overhangs on the narrow end. The splitter 120 (further described below) couples to the first side 155 at the midpoint of the first side's 155 wide end. As such, the first side 155, side walls 165, and splitter 120 define a structure which supports the second side 160 when it is laid flat, and results in the diverter 100 body frame.

The side walls 165 are made of metal or another durable material able to withstand constant air flow exposure and impact from objects. The side walls 165 are shaped such that their length and orientation match the sides of the second side 160. One of the side walls 165 is coupled with the other side of the hinge 135 that couples with the second side 160 (described above). The opposite side wall 165 is coupled with a second part of a lock 140 that interlocks with the first part of the lock 140 that couples with the second side 160. The air jets 110, 115 may include ports or nozzles that couple to perforations on the side walls 165 to enable pressurized air to be emitted. The air jets 110, 115 couple to the side walls 165 near the narrow end (see FIG. 1C). In some embodiments, the air jets 110, 115 are fixedly coupled with the side walls 165. However, in other embodiments the air jets 110, 115 removably couple to the side walls 165 by way of a screw-like or clip mechanism. In this embodiment, the side walls 165 are tall enough such that there a cavity at least 0.185" in height when the second side 160 is in a closed configuration, so that a standard medication container cap can lie flat on the inside of the diverter 100.

The splitter 120 is made of metal or another durable material able to withstand constant air flow exposure and impact from objects. The splitter couples to the wide end of the first side 155. The splitter 120 has a triangular shape and couples with the edge of the wide end of the first side 155, such that one of the splitter's 120 edges aligns with the edge of the first side's 155 end, and one of the splitter's 120 points orients directly into the diverter 100. In other words, the splitter 120 extends into the diverter, such that one of its pointed ends is in the innermost part of the diverter 100 and the wide end faces outwardly. As such, the splitter 120 helps separate the first side's 155 wide end into the two outlets 125, 130 (described below). It should be noted that the splitter's 120 narrow-to-wide placement directs objects, such as medication container caps or medication containers, towards each of the outlets 125, 130.

The inlet 105 is an opening defined by the narrow end of the first side 155, the side walls 165, and the narrow end of the second side 160, when the diverter 100 is in a closed configuration (described below). Medication container caps or other objects enter the diverter 100 through the inlet 105 from a pneumatically connected conveyance tube.

The outlets 125, 130, are openings defined by the wide end of the first side 155, the side walls 165, the wide end of the second side 160, and the splitter 120, when the diverter 100 is in a closed configuration (described below). Medication container caps or other objects exit the diverter 100 through the outlets 125, 130 to respective conveyance tubes.

The air jets 110, 115 are coupled with the side walls 165 near the inlet 105 (described above). The air jets 110, 115 are made of metal or another durable material that can withstand continuous exposure to air pressure and impact by objects. The air jets 110, 115 couple with the side walls 165 at an angle (discussed below) such that air flow is directed at a given angle into the diverter 100. On the other end, the air jets 110, 115 are coupled to valves 185 (see FIG. 3), which are coupled to one or more pressurized air source 180. The pressurized air source(s) 180 can include a pressurized tank or an online source, and include a pressure regulator to safeguard the air jets 110, 115 and valves 185 (described below, seen in FIG. 3).

Overall, the diverter 100 has a narrow end and a wide end, and two sides that connect both ends. The inlet 105 is located at the narrow end and the first and second outlets 125, 130, separated by the splitter 120, are located at the wide end. Additionally, the first and second air jets 110, 115 are located across one another, on the side walls 165 near the narrow end of the diverter 100 and near the inlet 105.

FIG. 1C shows a section, top-down view of the diverter 100. This section view better shows that the air jets 110, 115 are coupled to the sides of the diverter 100 such that they can each direct air towards first and second inner walls 145, 150. More specifically, the first air jet 110 couples to the diverter 100 on the first outlet 125 side such that it can emit pressurized air across, towards the second inner wall 150 on the second outlet 130 side. Similarly, the second air jet 115 couples to the diverter 100 on the second outlet 130 side such that it can emit pressurized air across, towards the first inner wall 145 on the first outlet 125 side. Each air jet 110, 115 is configured to emit pressurized air to the side opposite of where the air jet 110, 115 couples with the diverter 100. Moreover, in this embodiment, the air jets 110, 115 emit pressurized air at an angle of 45° relative to the inner wall 145, 150 towards which the air flow is emitted. However, in other embodiments the air jets 110, 115 emit pressurized air at angles ranging between 20° to 75°. In yet another embodiment, the diverter 100 can include only one air jet 110 or 115, such that the diverter 100 directs objects towards one outlet 125 or 130 using the air flow principles explained below and towards the other outlet 125 or 130 through gravity or a pneumatic pressure received through the inlet end 105 from a pneumatically connected pneumatic conveyance tube.

Figure 2A:
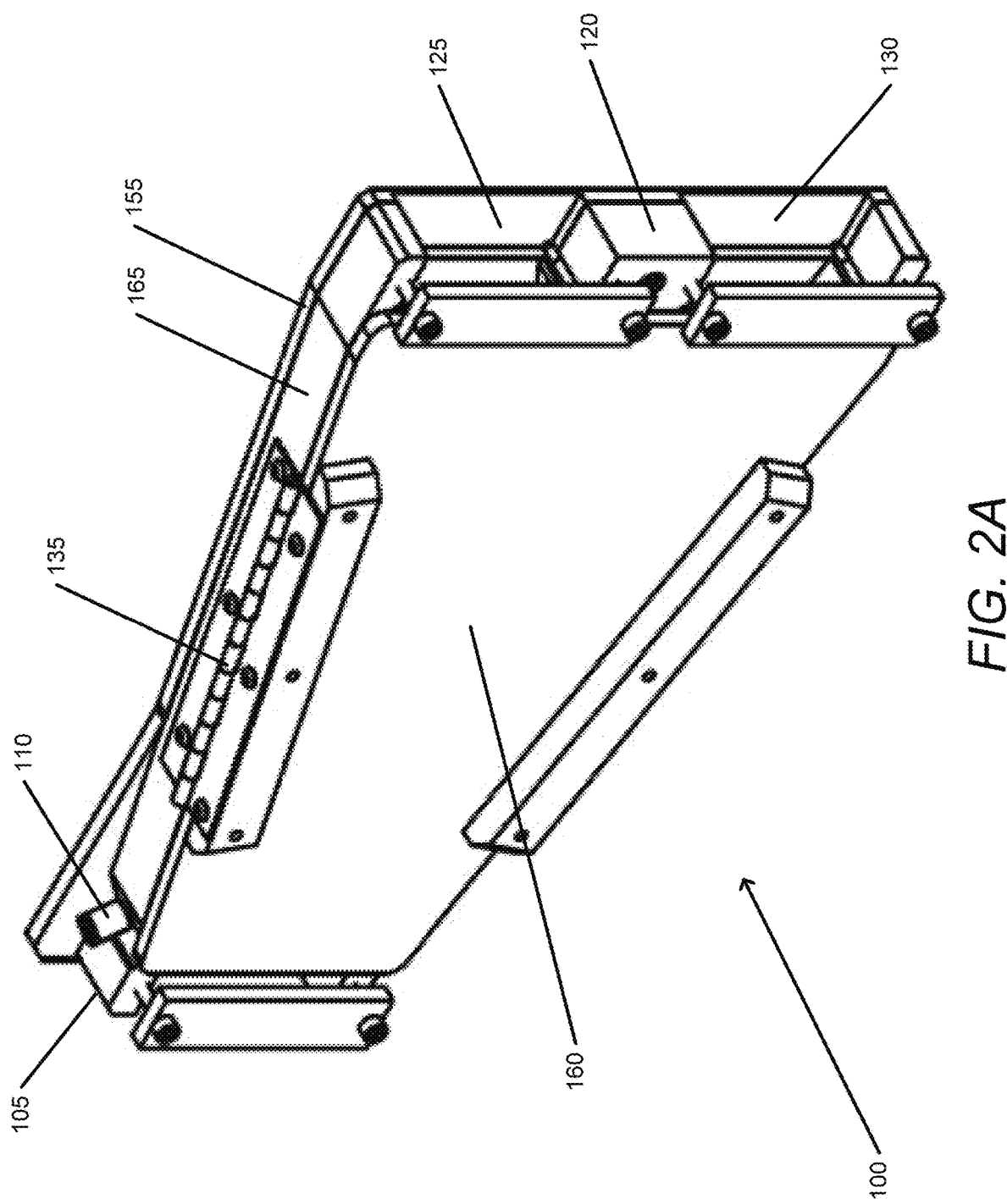
FIG. 2A-C are perspective views of a pneumatic conveyance jet diverter, according to an example embodiment of the present disclosure.
Figure 2B:
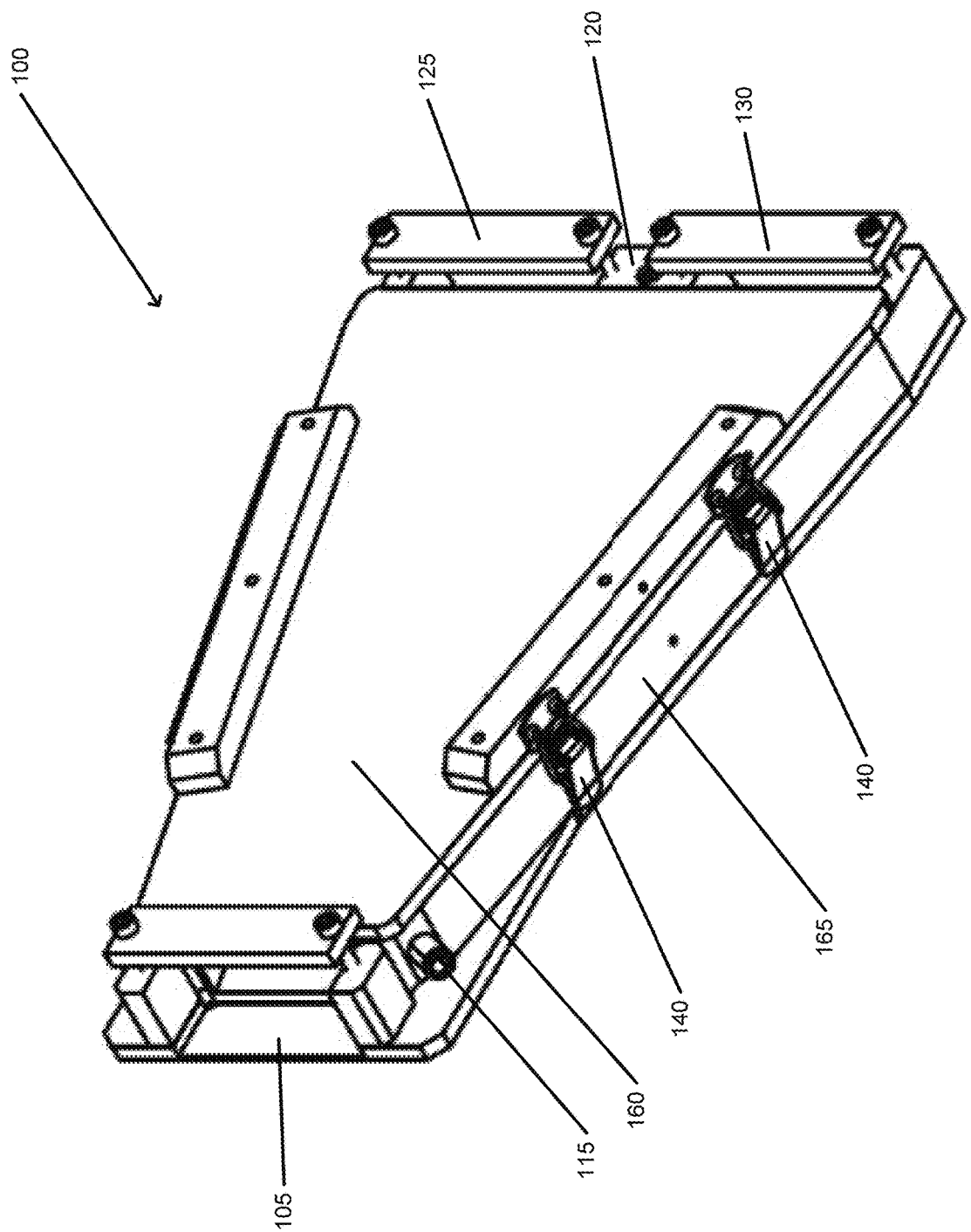
Figure 2C:
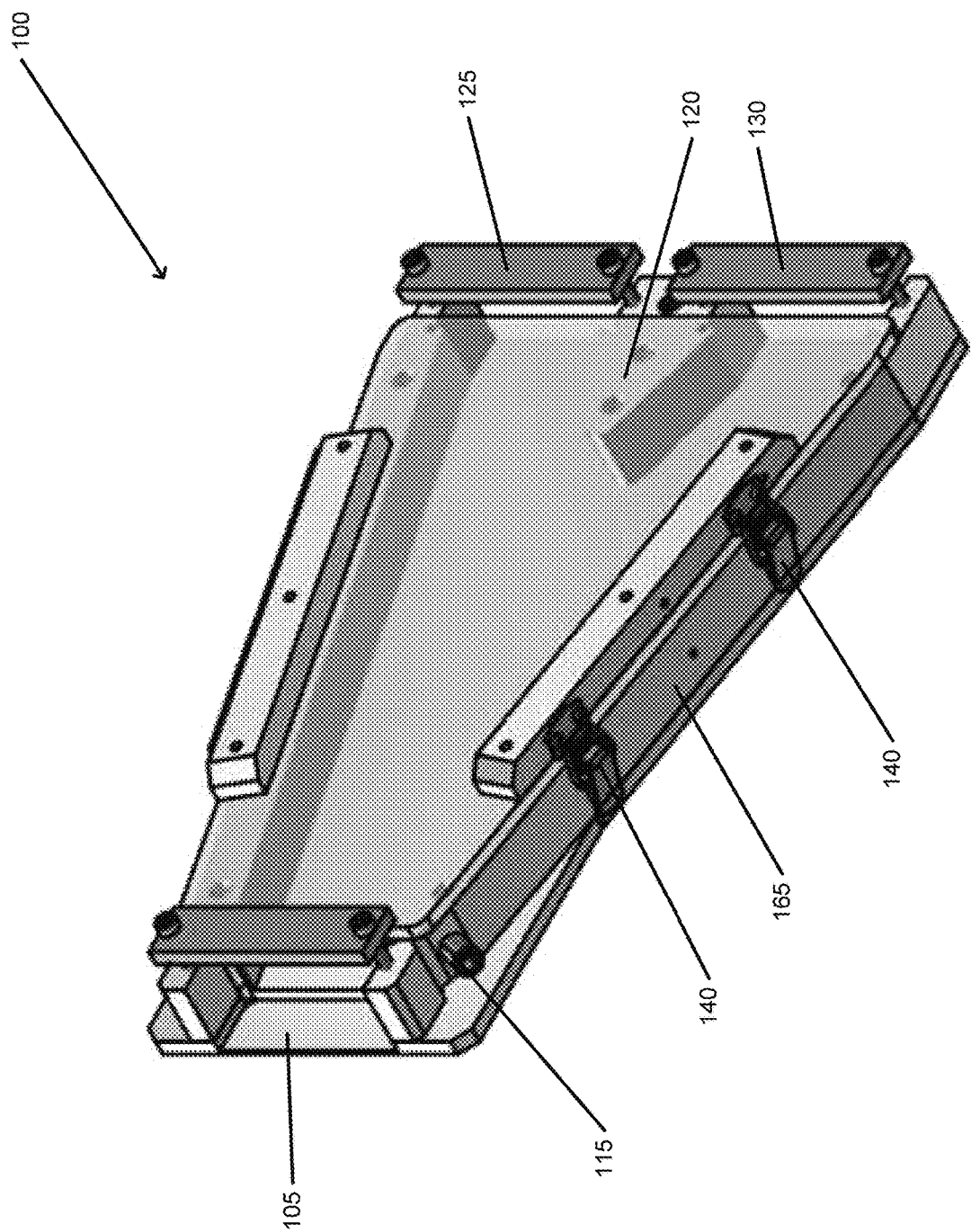

FIGS. 2A-C illustrate a pneumatic conveyance jet diverter. FIG. 2A shows a perspective view of the diverter 100 from an outlet-facing, top angle. The diverter 100 includes a second side 160 and a first side 155 (as described in FIG. 1A-B), side walls 165, and a splitter 120. The side walls 165 flank the sides of the second side 160 and first side 155, and act to couple the second side 160 and first side 155, so as to create a diverter frame. Moreover, on a narrower end of the diverter frame, the second side 160, first side 155, and side walls 165 define the opening that is the inlet 105 (as described above). Relatedly, on a wider end of the diverter frame, the second side 160, first side 155, and side walls 165, with the splitter 120 at the midpoint between the side walls 165, define the first and second outlets 125, 130, also previously described. Additionally, the hinge 135 couples one of the side walls 165 and the second side 160. As such, the second side 160 can move about the rest of the diverter 100 by pivoting about the hinge 135.

On the other hand, as shown in FIG. 2B, a perspective view of a diverter 100 from an inlet-facing, top angle, the side wall 165 opposite the hinge 135, couples with locks 140. The locks 140 allow users to selectively secure the second side 160 when it rests on top of the side wall 165 with the locks 140. As such, the diverter 100 can have an open configuration and a closed configuration.

FIG. 2C shows a transparent, perspective view the diverter 100 from an inlet-facing, top angle. As further seen in the figure, the splitter 120 that defines the first and second outlets 125, 130 extends into the diverter 100 (as described above). In this figure, it can be appreciated how the geometry of the splitter 120 serves to direct objects towards each respective outlet 125, 130

Figure 5:
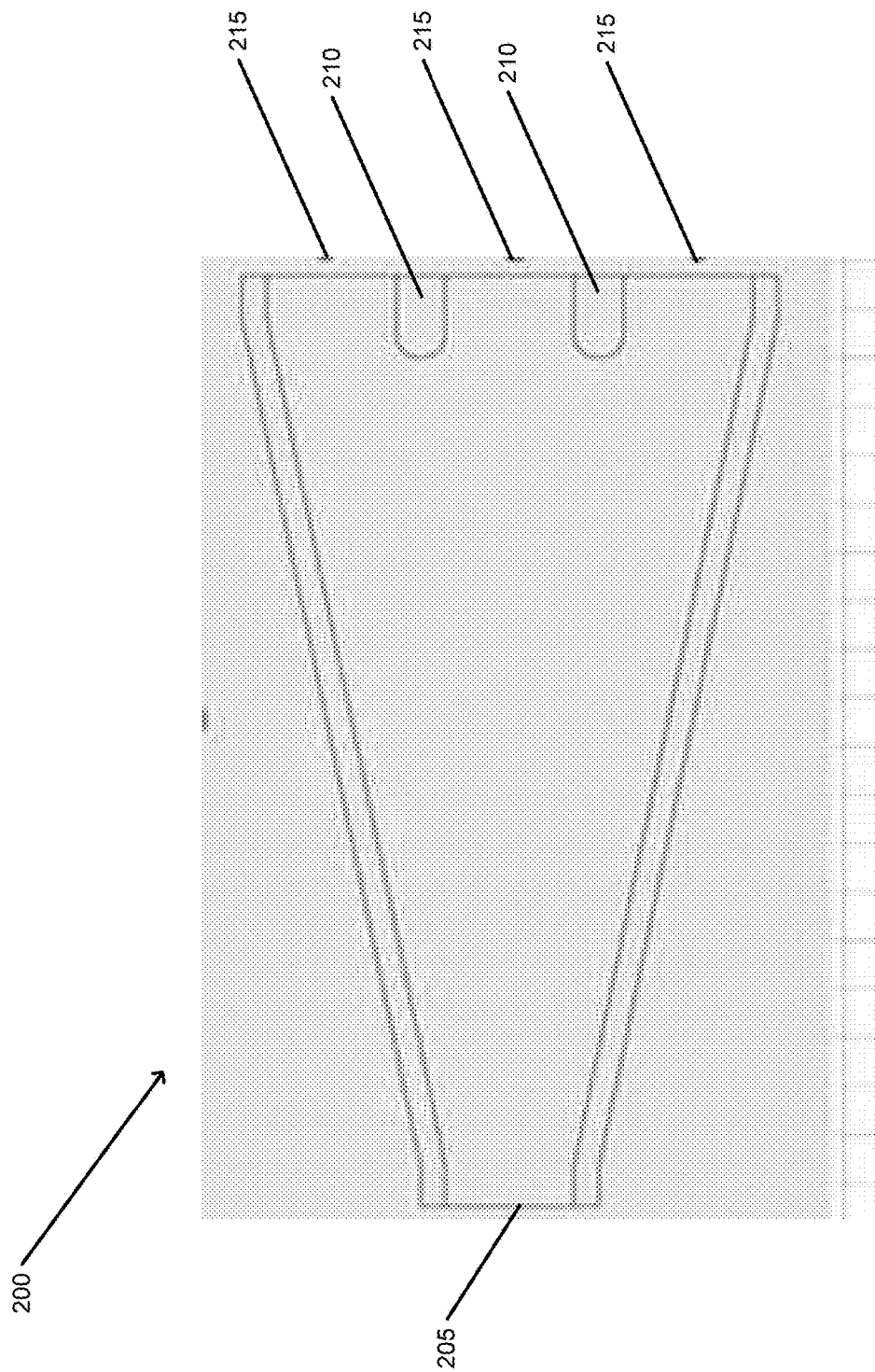
FIG. 5 is a top-down view of a pneumatic conveyance jet diverter with three outlet openings, according to an example embodiment of the present disclosure.

FIG. 5 illustrates a pneumatic conveyance jet diverter 200 with three outlets 215. The diverter 200 in FIG. 5 is an alternate embodiment that includes two splitters 210 that define three outlets 215. As such, users can use the diverter 200 to direct objects, such as medication container caps, to three different destinations. See below for an explanation of how the use of three outlet 215 openings affects the air flow directed to move objects.

Figure 6:
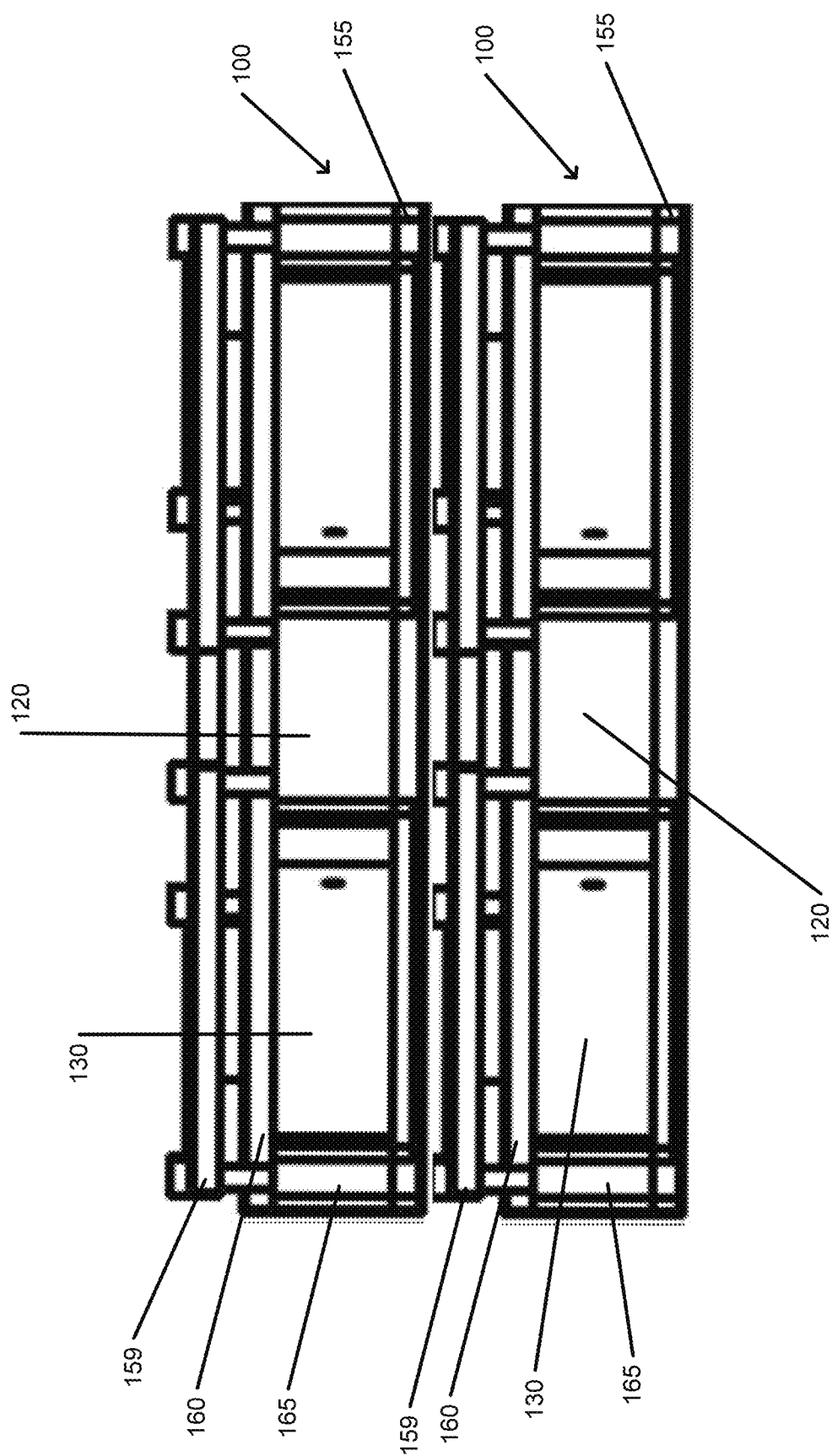
FIG. 6 is an outlet-side view of pneumatic conveyance jet diverters stacked on top of each other, according to an example embodiment of the present disclosure.

FIG. 6 illustrates multiple pneumatic conveyance jet diverters 100 stacked on top of each other from an outlet-facing side view. Each diverter 100 includes a stacking assembly 159. The stacking assembly 159 is made of metal or another durable material and can be coupled to the second side 160 of the diverter 100 near the narrow and wide ends of the second side 160. The stacking assembly 159 interacts with the first side 155 of the diverter 100, such that users can securely stack multiple diverters 100 for simultaneous, cascade-like use. As such, users can employ multiple diverters at once, each diverting different objects, such as one diverting medication container caps and one diverting medication bottles, to the same destination. It should be noted that, as seen in FIG. 6, the height of the side walls 165 and splitter 120 define the height of the outlet 130, which in turn limits which objects can be used with the diverter 100. In the present embodiment, for example, the height of the side walls 165 is such that a medication container cap of 0.185" in height can pass through the outlet 130 (as described above). However, in alternate embodiments, the diverter 100 can be used to direct smaller and lighter medication container caps, and dimensions can be scaled up to divert larger medication container caps. Relatedly, in alternate embodiments, the diverter 100 inlet (not shown) and outlets (130), as well as inner chamber (not shown), can be made cylindrical to direct vials or bottles.

Figure 10:
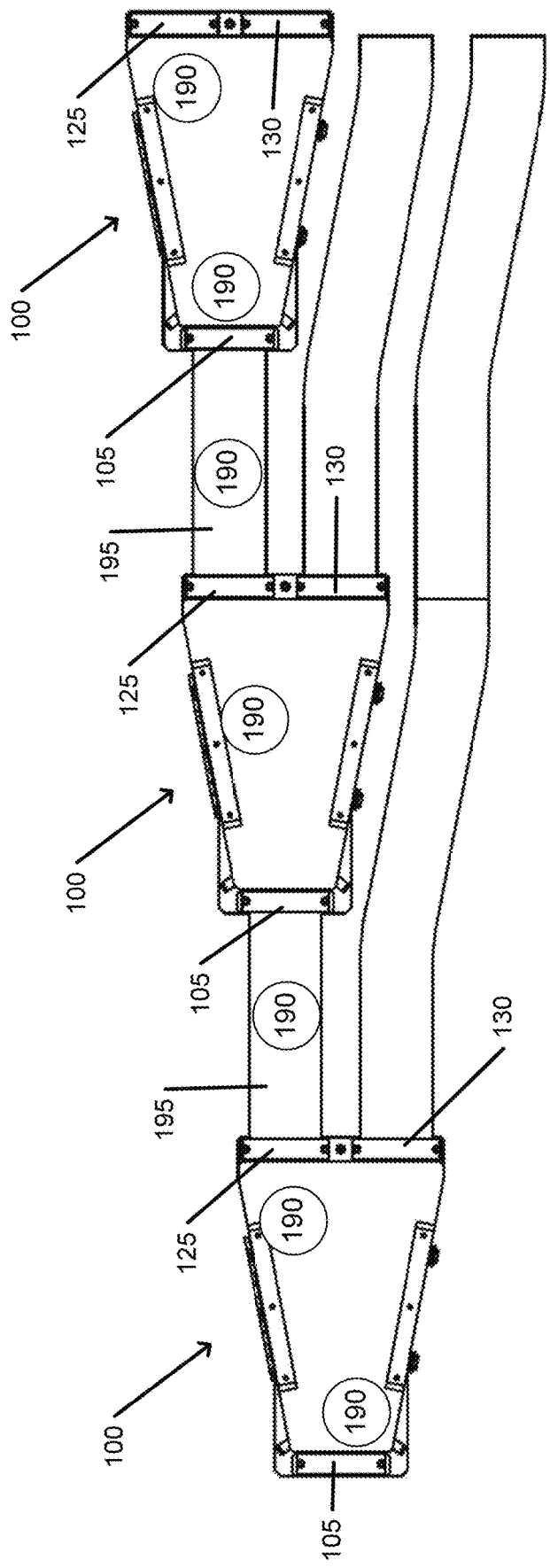
FIG. 10 is a top-down view of multiple pneumatic conveyance jet diverters aligned in series, according to an example embodiment of the present disclosure.

FIG. 10 illustrates a top-down view of multiple pneumatic conveyance jet diverters 100 aligned in series in an inlet to outlet order. Each diverter 100 is arranged inlet 105 to outlet 125, 130 such that caps 190 can travel from one inlet 105, through the diverter 100, and exit through an outlet 125, 130. In this configuration, users feed a cap 190 through an inlet 105, the cap travels through the diverter to a user-selected outlet 125, exits the outlet 125 onto a conveyor 195. The cap 190 continues on the conveyor 195 onto a successive inlet 105 and again travels through a diverter 100 and out a user-selected outlet 125. Users can align as many diverters 100 as desired in this configuration to create a sequence of interconnected diverters 100 for routing among a plurality of different paths.

Pneumatic Conveyance Jet Diverter Air Flow

Figure 3:
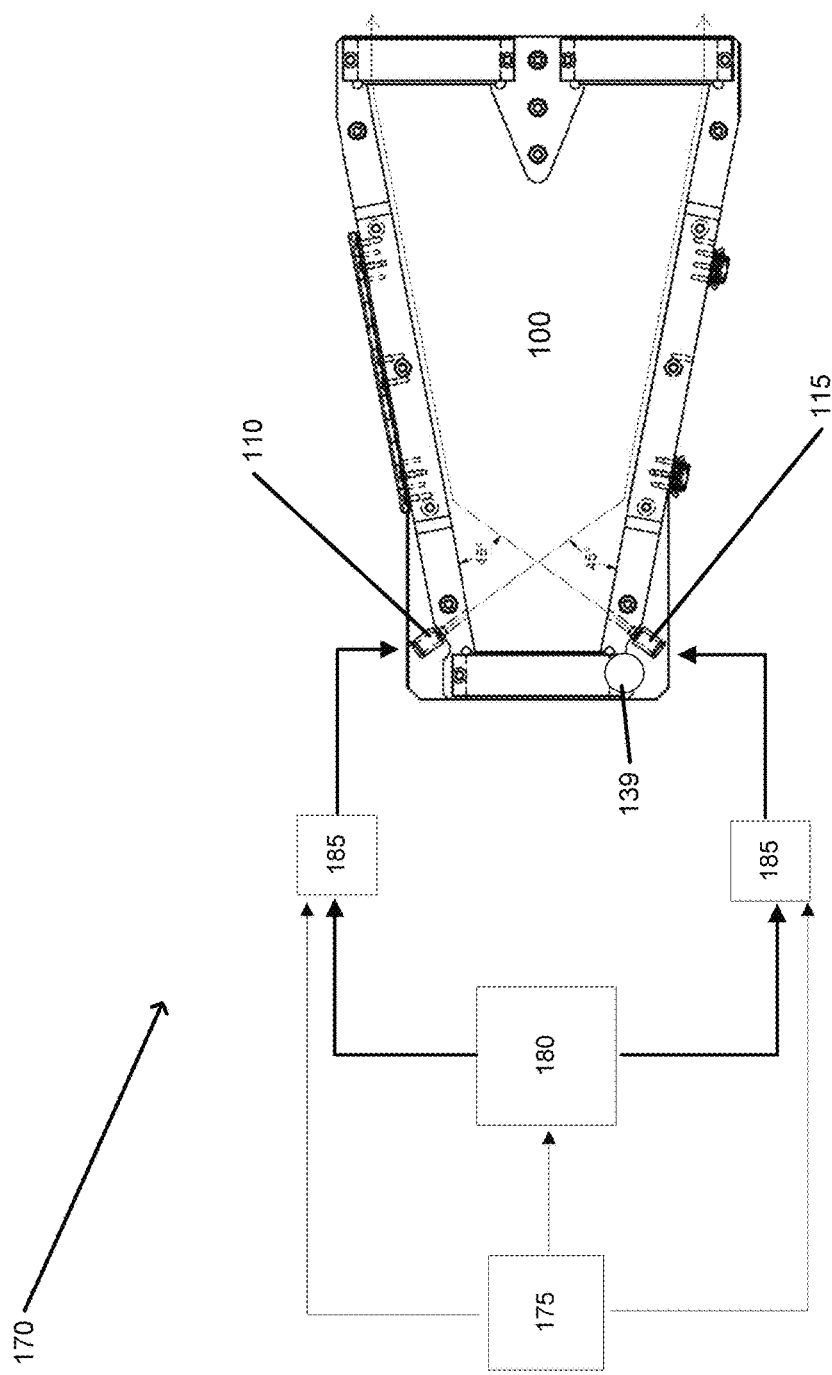
FIG. 3 is a system diagram of a computer controlling air sources for a pneumatic conveyance jet diverter, according to an example embodiment of the present disclosure.

FIG. 3 shows a diagram of the system 170, which includes a computer 175 configured to control pressurized air sources 180 for the diverter 100, as discussed above. The system 170 includes a computer 175, a pressurized air source 180, valves 185, air jets 110, 115, and the diverter 100. In some embodiments, the system 170 may also include one or more sensors 139 to detect entry of an object into the diverter 100. While the sensor 139 is shown at the inlet end 105 of the diverter 100, in other examples the sensor 139 may be located on a conveyance tube that is connected to the inlet end 105. Placing the sensor 139 upstream from the diverter 100 provides additional time for activating the valve 185 (after detection) to cause pressurized air to emit from the respective air jet. The valves 185 can include globe, gate, ball, plug, or butterfly valves, among others. Additionally, as noted above, a regulator steps down air pressure from the pressurized air source 180 to safeguard the valves 185. The computer 175 is configured to receive an input from users, such as desired air flow pressure used in the diverter 100.

Figure 9:
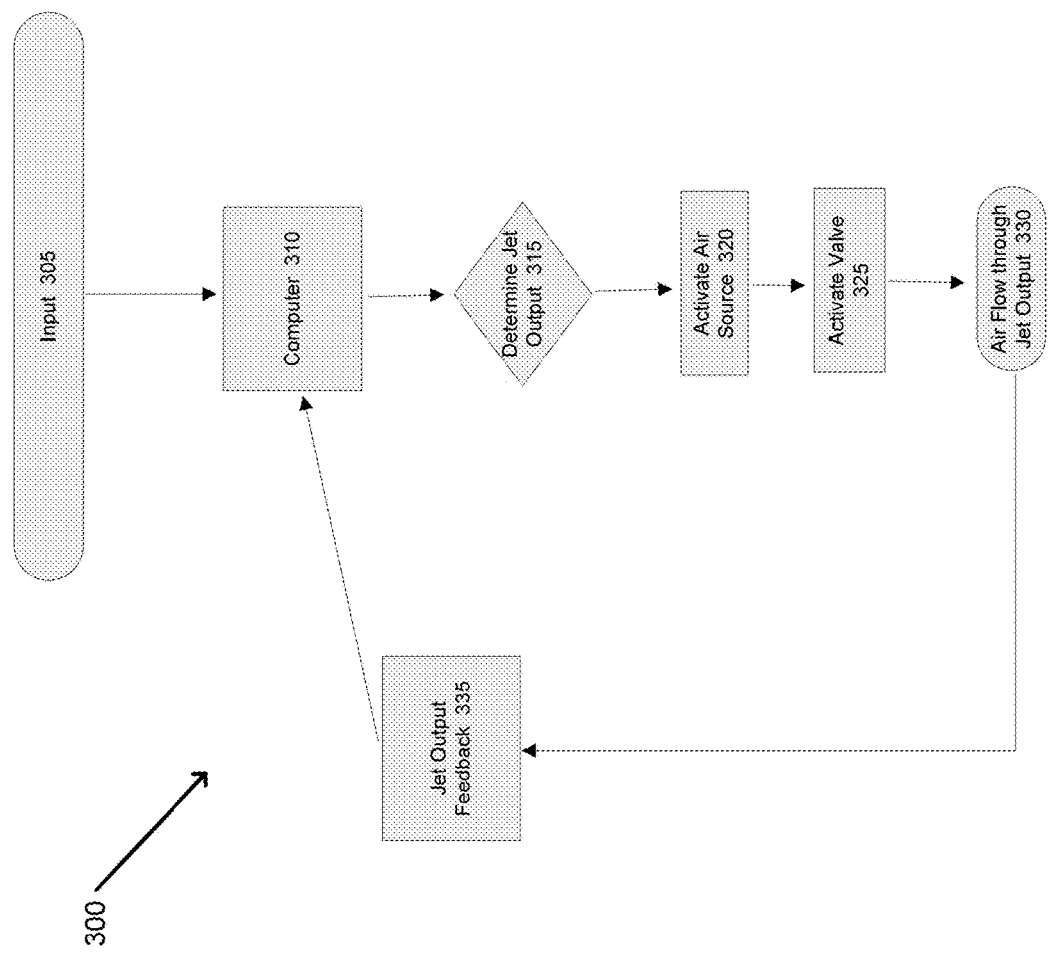
FIG. 9 is a diagram of a computer process to activate air jets by a computer, according to an example embodiment of the present disclosure.

Specifically, as seen in FIG. 9, a diagram is shown of a computer process to activate air jets by a computer based on one or more inputs 300. The computer process is performed after the computer 310 is configured with a desired air pressure for the air jets 110, 115, which may adjust a pressure setting on one or more regulators, the pressurized air source 180, and/or the valves 185. Alternatively, the pressure regulators, the pressurized air source 180, and/or the valves 185 are manually set. In some instances, the computer 310 is configured to change the pressure regulation based on a type of object that is to be routed. For instance, greater air pressures may be used to route medication containers compared to caps. Further, greater air pressures may be used to route larger medication containers compared to smaller medication containers.

In some instances, the computer 310 may adjust the pressure of the air flow directed by each air jet 330 by controlling the air source and valves such that the input corresponding to a desired air flow pressure is achieved. In one embodiment, the computer 310 monitors the pressurized air source and valves 335 and adjusts them to maintain the conditions associated with the input. As the computer 310 receives a different input, it may be configured to adjust the pressure of the air flow exiting the air jets. In turn, the computer 310 enables users and/or specified conditions to change the force of the air flow to move different objects of different weights and/or change the speed with which the diverter directs objects, such as medication container caps.

After the computer 310 is configured with a specified air pressure, the computer 310 is configured to determine when the air jets 110, 115 should be activated. As shown in FIG. 9, the computer 310 receives one or more inputs 305 to determine an appropriate jet output 315, from a table or directory, for example, and transmit a resulting signal to the pressurized air source and valves. The table or directory may specify a desired path of travel for an object among the different paths defined within the diverter 100. Alternatively, the computer 310 may alternate between the paths. In some instances, the computer 310 may receive an indication that one path is blocked, congested with objects, or otherwise inoperable downstream from diverter 100. The computer 310 accordingly routes the objects through the diverter 100 to the available one or more paths by opening the appropriate valve 185. The computer 310 transmits the jet output 315 when it is determined that one or more of the air jets 110, 115 are to be activated. A closed jet output 315 maybe transmitted to close the valve 185. Alternatively, the jet output 315 may cause the valve to remain open for a duration, such as 100 milliseconds, 250 milliseconds, 500 milliseconds, 1 second, 2 seconds, etc.

The jet output 315 is configured to activate the air source and/or the valves 320, 325 (e.g., the valves 185). The valves are pneumatically coupled to each of the air jets, respectively. When only one air jet is used for the diverter 100, the jet output 315 is configured to transmit a signal causing the corresponding valve to open for a specified duration or remain open until a close jet output 315 is received. When two or more air jets are used for routing to respective outlets, the computer 310 transmits the jet output 315 to the valve that is to be opened to allow for the flow of pressurized air to reach the corresponding air jet.

Additionally, the computer 310 is also configured to receive an object type, such as a medication container or cap, weight or size and use a look up table to determine a specified pressure. Relatedly, in alternate embodiments, the computer 310 receives data from the sensor 139 indicative of an object type, weight, and size, and similarly uses a look up table to determine a specified pressure. It should be noted that in alternate embodiments, a single computer simultaneously controls air sources and valves for multiple diverters.

Figure 8:
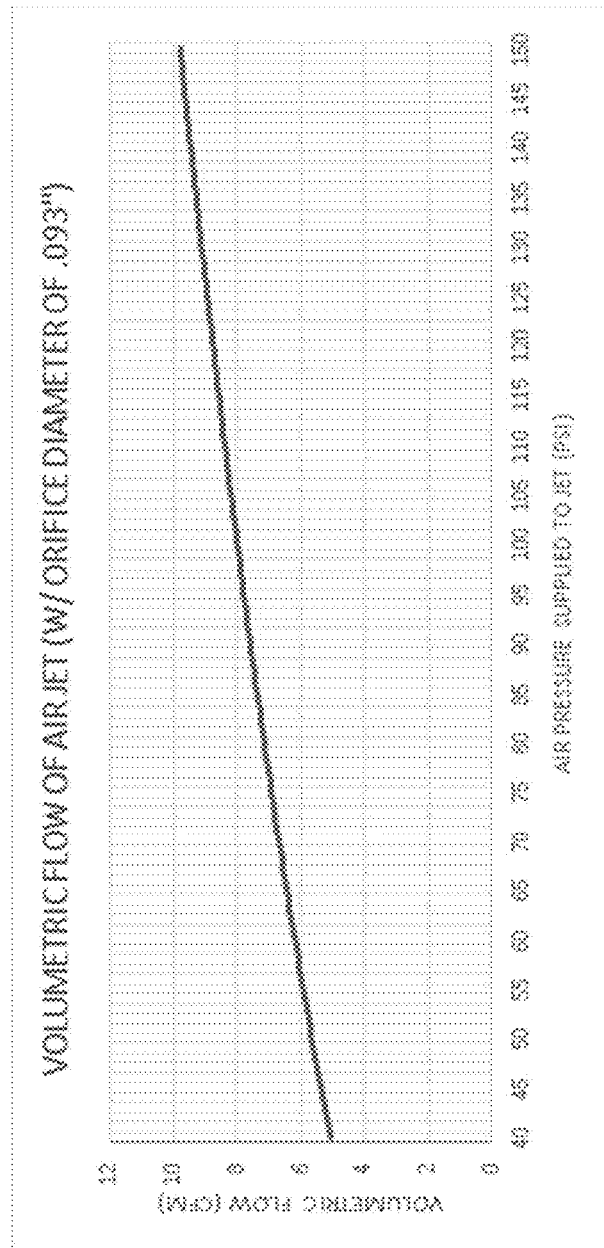
FIG. 8 is a graph of simulated volumetric flow of an air jet with an orifice diameter of 0.093", according to an example embodiment of the present disclosure.

FIG. 8 shows a graph of a simulated volumetric flow of an air jet with an orifice diameter of 0.093". As seen in the graph, as air pressure supplied to the jet increases, so does the volumetric flow of air. It should be noted that in the present embodiment, with the same orifice of 0.093", the air jet emits pressurized air within a range of 70 to 90 psi, with a lower limit pressure of about 40 psi. The highest pressure measured in this embodiment is 100 psi. However, different embodiments can operate at higher or lower pressure levels.

Figure 4:
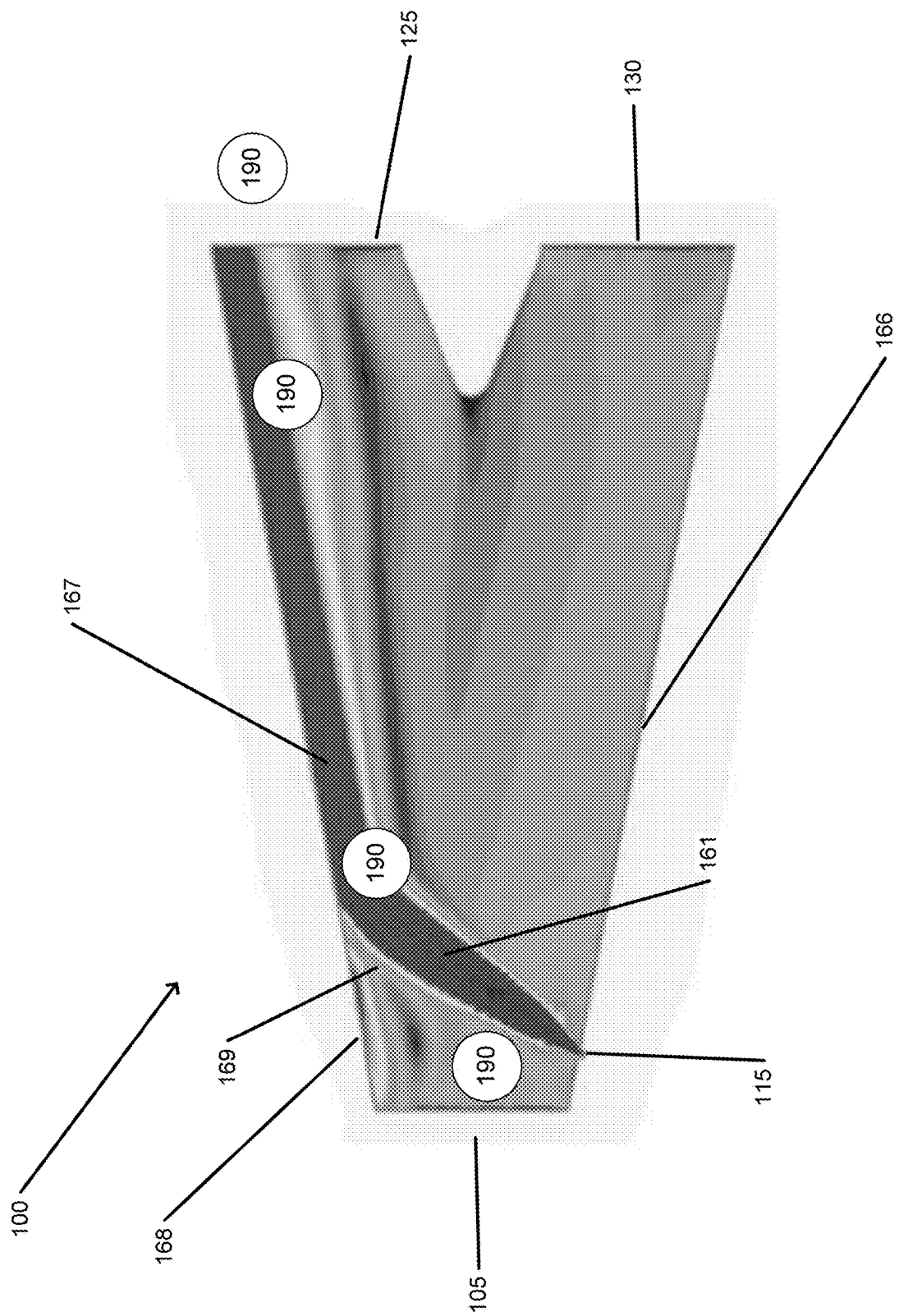
FIG. 4 is a top-down view of an airflow simulation in a pneumatic conveyance jet diverter, according to an example embodiment of the present disclosure.

FIG. 4 illustrates an airflow simulation of the diverter 100 for pneumatically routing objects, such as medication container caps 190. As seen in the figure, air 167 flows from an air jet 115 located on the inner wall 166 across from the inner wall 167 and towards the outlet 125. More specifically, the air jet 115 directs the air 167 flow such that the air 167 hits the inner wall 168 at an angle 169, in this embodiment 45°, and continues out towards the outlet 125. Shaded area 161 represents faster moving air. In operation, an object, such as the medication container cap 190, enters the diverter 100 through the inlet 105 from a pneumatic conveyance tube. The cap 190 is pushed by the air flow 167 towards the inner wall 168 opposite the air jet 115. The air flow 167 continues to push the cap 190 along the inner wall 168 towards the outlet 125. Once the cap 190 reaches the outlet 125, it is pushed out of the diverter 100 by the air flow 167 to an outlet conveyance tube. The same principle is used to move objects to the opposite outlet 130. However, in this case, an air jet, such as air jet 115, would be located on the inner wall 168, and the air 167 flow would be directed towards the inner wall 166.

Relatedly, FIG. 5 illustrates a diverter 200 with three outlets 215. In the illustrated embodiment, the same airflow principles as explained above underlie the movement of objects, such as medication container caps, from an inlet 205 to outlets 215 of the diverter 200. However, when users want to direct a cap to the middle outlet 215, there is no need to use an air j et, but rather the cap simply continues its linear path of travel from the inlet 205, through the inside of the diverter 200, straight out the middle outlet 215. In other embodiments, an air jet and valve are configured to emit two different pressures. A first lower pressure may direct the object to the center outlet 215. A second higher pressure directs the object to the further outlet 215.

It should be noted that in some embodiments the air jets may emit a continues air flow. In these embodiments, the flow of air from the air jets is changed periodically based on downstream conditions or based on a specified schedule that is stored in a table. In these embodiments, the sensors may be omitted.

Pneumatic Conveyance Jet Diverter in Pharmacy Conveyance System

Figure 7:
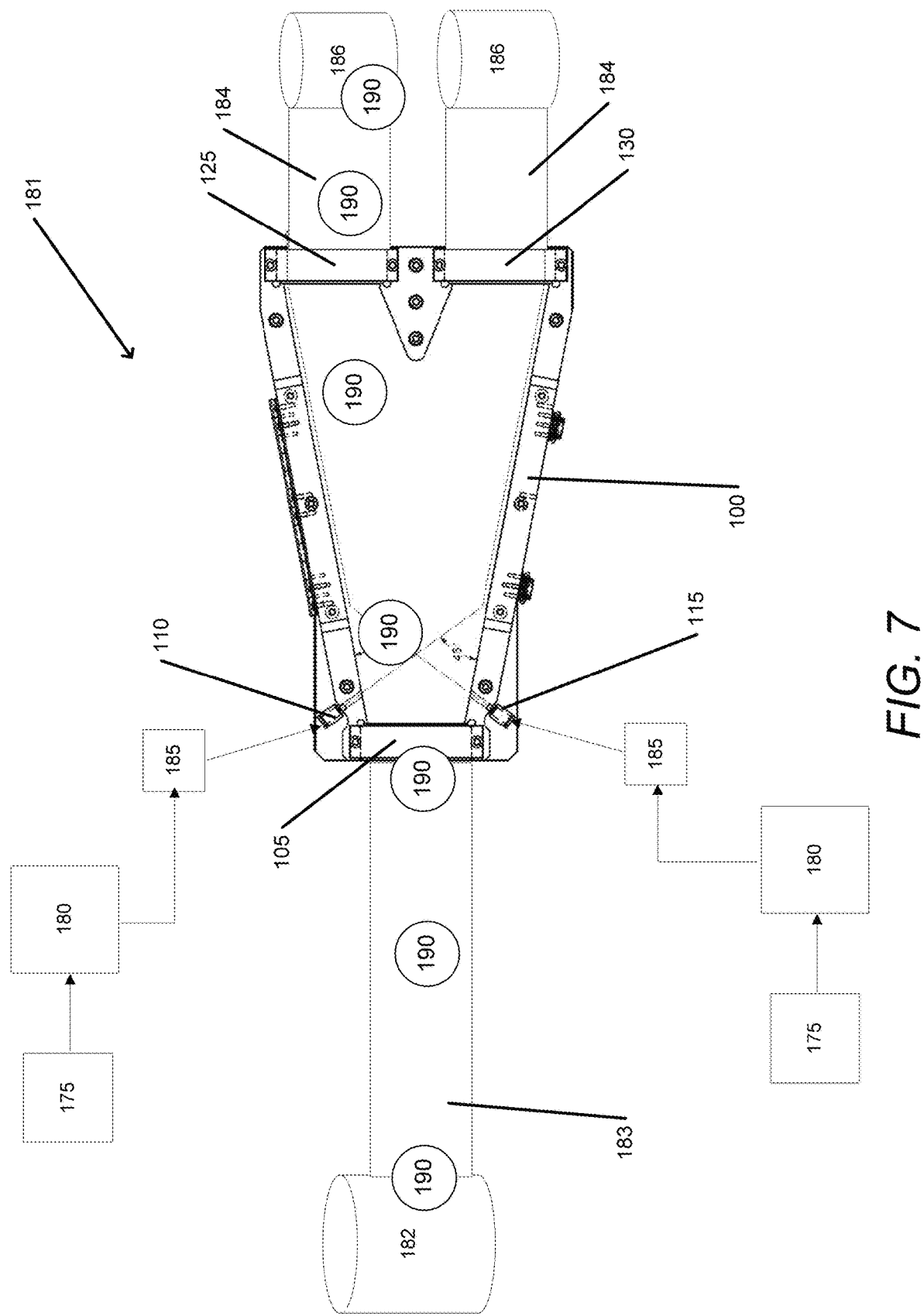
FIG. 7 is a system view of a pneumatic conveyance jet diverter as part of a pharmacy conveyance system, according to an example embodiment of the present disclosure.

FIG. 7 illustrates the example diverter 100 as part of a pharmacy conveyance system 181. The system 181 includes a medication container cap source 182, a computer 175, an inlet conveyor 183 (e.g., a pneumatic tube), the diverter 100, outlet conveyors 184 (e.g., outlet pneumatic tubes), and destinations 186 (e.g., fulfillment stations). Users begin by providing the computer 175 one or more pressure settings for the air source 180 and valves 185, as described above. As such, the air jets 110, 115 activate according to the user-input air flow settings, also as described above. Next, a medication container cap 190 exits the source 182 and travels through the inlet conveyor 183 towards the inlet 105. After the cap 190 enters the diverter 100, it is directed to the desired outlet 125 opening by pressurized air, as explained above. The cap 190 exits the diverter 100 through the desired outlet 125 and travels to the outlet conveyor 184 towards a destination 186. As such, the use of the diverter 100 in a pharmacy conveyance system 181 enables users to selectively direct objects, such as medication container caps or medication containers, to desired destinations without mechanically moving tubes or actuators. It should be noted that users can incorporate multiple diverters in stacked, cascading configurations, as explained above, to simultaneously selectively direct various objects from different sources to the same destinations. For example, users can use said configurations to direct medication container caps and medication containers to the same destination.

CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A pneumatic conveyance jet diverter comprising:
   a diverter frame including:
      an inlet end having a first width,
      an outlet end having a second width that is wider than the first width, the outlet end including a first outlet and a second outlet,
      side walls connecting the inlet end and the outlet end, and
      a lid coupled to one of the side walls;
   an air jet positioned along one of the side walls and configured to at least partially face the outlet end, the air jet being located near the inlet end and the second outlet being positioned to be closer to the air jet than the first outlet; and
   at least one splitter located at the outlet end between the first outlet and the second outlet,
   wherein the air jet is configured to emit pressurized air causing a medication container cap to be routed to the first outlet,
   wherein the air jet emits air at an angle such that a resulting air path flows to a side wall that is opposite the air jet and along the diverter frame, out to the first outlet, and
   wherein an absence of the pressurized air from the air jet causes the medication container cap to be routed to the second outlet.

2. The pneumatic conveyance jet diverter of claim 1, wherein the diverter frame has a narrow end at the inlet end that gradually widens to an opposite, wide end at the outlet end.

3. The pneumatic conveyance jet diverter of claim 1, wherein the inlet end of the diverter frame is pneumatically connected to a conveyance tube that provides the medication container cap.

4. The pneumatic conveyance jet diverter of claim 1, wherein the diverter frame is symmetrical along a longitudinal axis extending between a center of the inlet end to a center of the outlet end.

5. The pneumatic conveyance jet diverter of claim 1, wherein the lid is coupled to the side wall of the diverter frame via a hinge that is opposite from the side wall that includes the air jet.

6. The pneumatic conveyance jet diverter of claim 5, wherein the medication container cap is received through the inlet end of the diverter frame and travels along a path of the air jet through the outlet end.

7. The pneumatic conveyance jet diverter of claim 1, further comprising a sensor located adjacent to the inlet end.

8. The pneumatic conveyance jet diverter of claim 7, wherein the sensor is configured to:
   sense the medication container cap being received through the inlet end; and
   after sensing the medication container cap, transmit a signal to a computer that determines whether the air jet should be activated to emit the pressurized air.

9. The pneumatic conveyance jet diverter of claim 1, wherein the first outlet is pneumatically connected to a first outlet conveyance tube and the second outlet is pneumatically connected to a second outlet conveyance tube.

10. A pneumatic conveyance jet diverter system comprising:
   a diverter frame including:
      an inlet end having a first width,
      an outlet end having a second width that is wider than the first width, the outlet end including a first outlet and a second outlet,
      first and second side walls connecting the inlet end and the outlet end, and
      a lid coupled to one of the side walls;
   a first air jet positioned along the first side wall and configured to at least partially face the first outlet;
   a second air jet positioned along the second side wall and configured to at least partially face the second outlet; and
   at least one splitter located at the outlet end between the first outlet and the second outlet,
   wherein the first air jet, when activated, is configured to emit pressurized air causing a medication container cap or a medication container to be routed to the first outlet,
   wherein the second air jet, when activated, is configured to emit pressurized air causing the medication container cap or the medication container to be routed to the second outlet, and
   wherein the second air jet emits air at an angle such that a resulting air path flows to the first side wall and along the diverter frame, out to the second outlet.

11. The pneumatic conveyance jet diverter system of claim 10, wherein the first air jet is pneumatically coupled to a pressure source via a first valve, and the second air jet is pneumatically coupled to the pressure source via a second valve.

12. The pneumatic conveyance jet diverter system of claim 11, wherein the first air jet is activated by opening the first valve and the second air jet is activated by opening the second valve.

13. The pneumatic conveyance jet diverter system of claim 12, wherein a computer is configured to cause either of the first valve or the second valve to open for routing the medication container cap or the medication container to either the first outlet or the second outlet.

14. The pneumatic conveyance jet diverter system of claim 13, further comprising a sensor located adjacent to the inlet end, the sensor configured to detect the medication container cap or the medication container entering the diverter frame.

15. The pneumatic conveyance jet diverter system of claim 14, wherein the computer is configured to determine whether the first valve or the second valve is to be opened after receiving an input from the sensor indicative of the detection of the medication container cap or the medication container.

16. The pneumatic conveyance jet diverter system of claim 13, wherein the computer is configured to alternate between opening the first valve and the second valve.

17. The pneumatic conveyance jet diverter system of claim 10, wherein the inlet end of the diverter frame is pneumatically connected to a conveyance tube that provides the medication container cap or the medication container.

* * * * *